Oct. 17, 1939.   S. W. BORDEN   2,176,758
EARTH RESISTANCE METER
Filed April 2, 1938    3 Sheets-Sheet 1

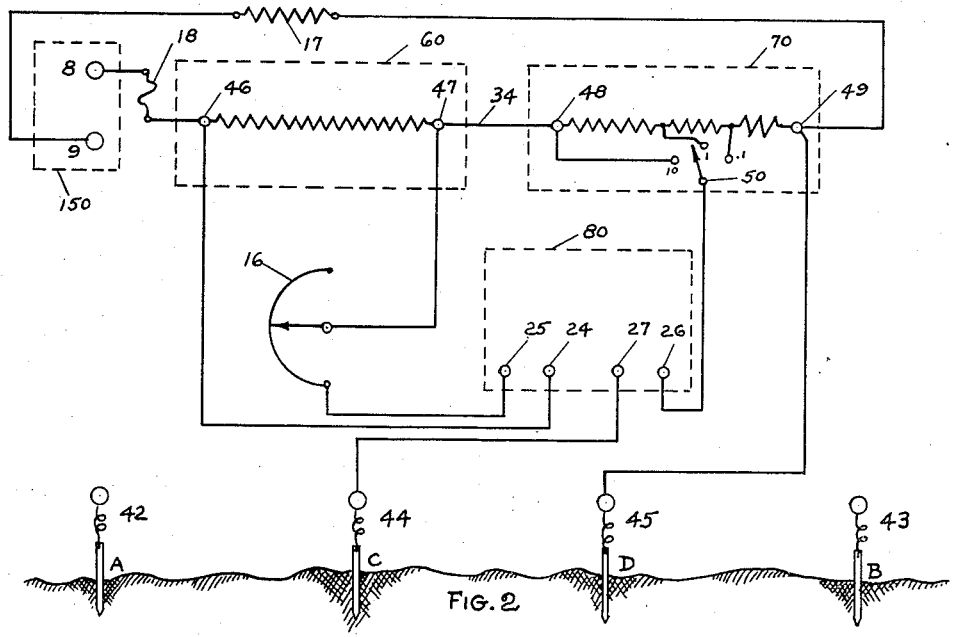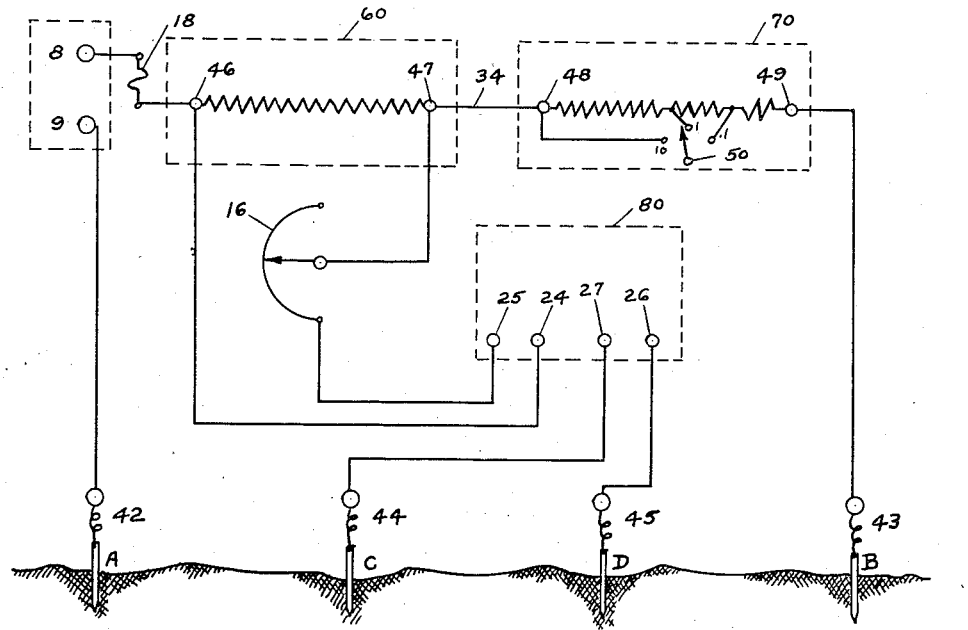

Oct. 17, 1939.  S. W. BORDEN  2,176,758
EARTH RESISTANCE METER
Filed April 2, 1938  3 Sheets-Sheet 3

Inventor
Stephen W. Borden

Patented Oct. 17, 1939

2,176,758

UNITED STATES PATENT OFFICE 2,176,758

EARTH RESISTANCE METER

Stephen W. Borden, Summit, N. J.

Application April 2, 1938, Serial No. 199,629

7 Claims. (Cl. 175—182)

This invention relates to equipment for ascertaining varying geophysical conditions of subterranean portions of the earth crust by measuring differences in the electrical conductivity of the same.

The conditions above referred to may relate to the presence of ore bodies which differ in their ability to conduct electricity from the rocks which surround the same, or to the presence of fractured or broken zones and the thickness and extent of loose or alluvial material, or to the presence of water- and oil-bodies.

The invention is therefore particularly adapted for determining the location of mineral deposits, as an aid in mining, for ascertaining the position of water- or oil-bearing structures for use in determining structure or stratum and for the location of wells and openings to prospect the same, or for observing the geological conditions of the earth crust as a preliminary to engineering work, such as the construction of dams, the driving of tunnels etc.

One of the objects of the invention is to provide equipment which, while having the necessary sensitivity, will be free from interference by foreign potentials created by stray earth currents or otherwise. Another object is to provide facilities for compensating for the electrode circuit resistance for certain kinds of tests. Other objects will appear from the specification and claims.

The equipment herein described is suitable for carrying out a test of the character described by F. G. Wenner in "A Method of Measuring Earth Resistivity," United States Bureau of Standards, Scientific Paper 258, 1915. The distinguishing feature of this method is that the potential between a pair of earth electrodes, due to a flow of current between another pair of earth electrodes, is measured for various locations and the geophysical conditions deduced therefrom.

Figure 1:
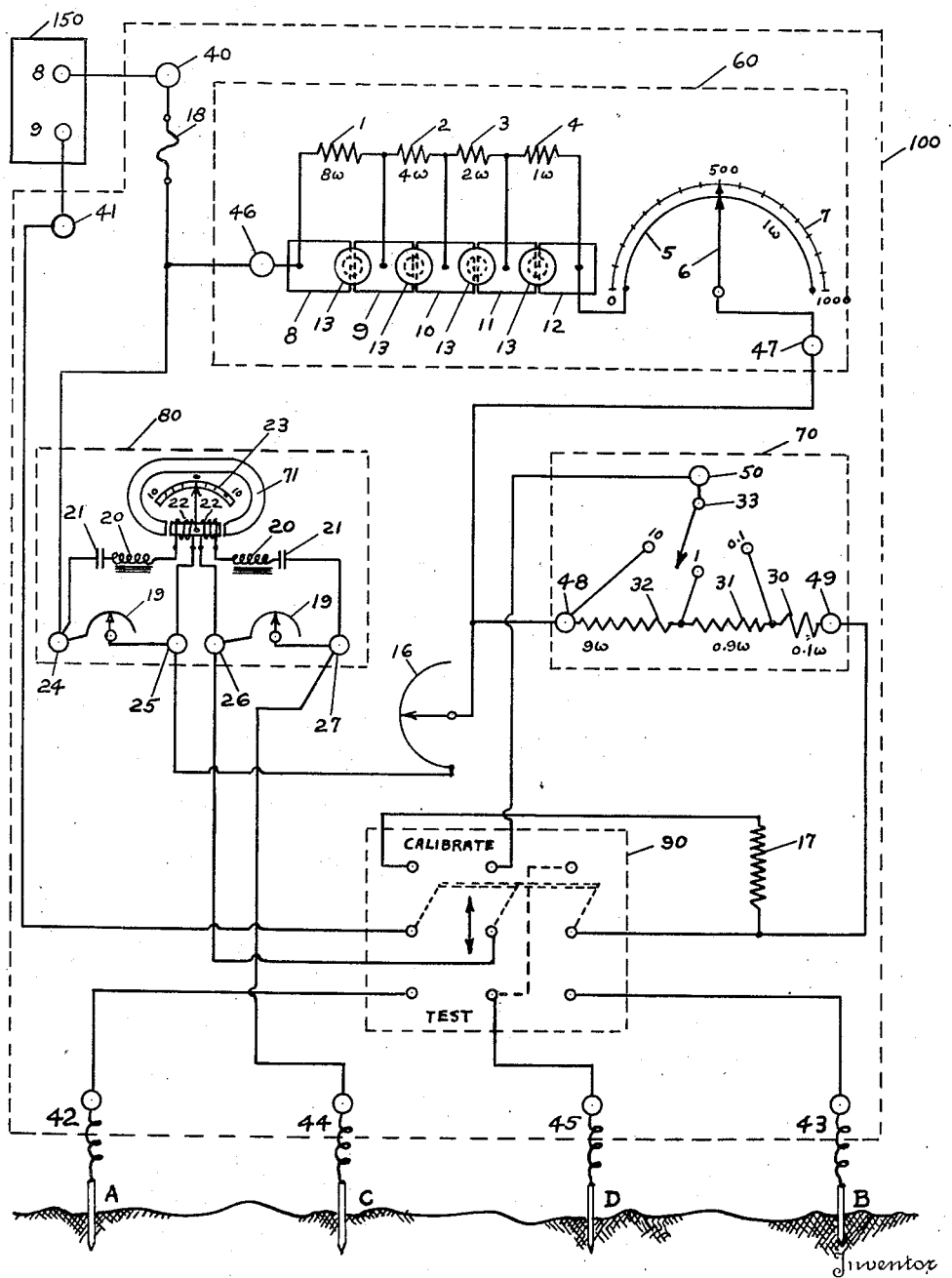
Figure 4:
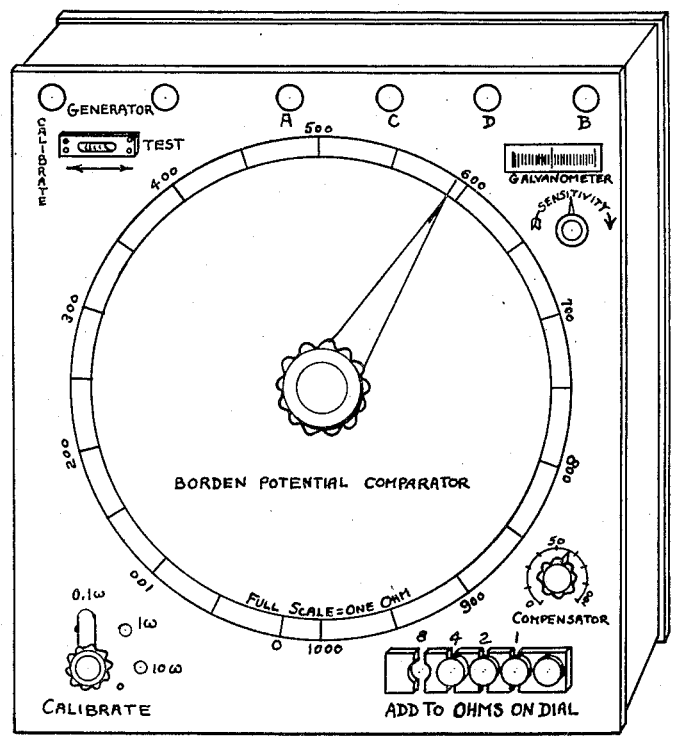
Figure 6:
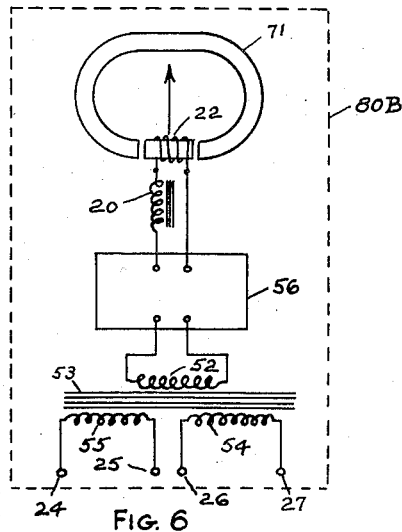
Figure 5:
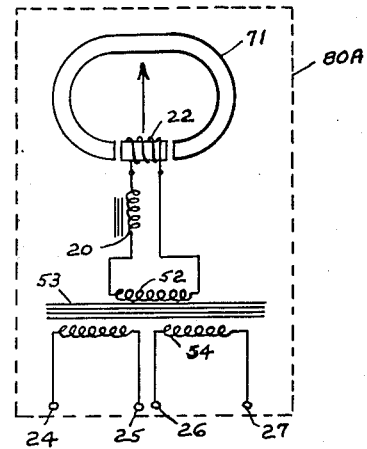

In the drawings, which are schematic, Fig. 1 illustrates the complete equipment arranged for a test. Fig. 2 is a simplified diagram showing the connections when the main switch of Fig. 1 is thrown to the "calibrate" position, and Fig. 3 is a similar diagram when the switch is thrown to the "test" position. Fig. 4 shows the pieces of equipment assembled into a unitary device. Fig. 5 is an alternative type of instrument for use in connection with Fig. 1, and Fig. 6 is the instrument of Fig. 5 with an amplifier added.

For carrying out these tests, I prefer swing current and a swing current meter. A complete exposition of the nature and use of swing current and swing current meters for testing purposes generally will be found in my co-pending application, Serial No. 199,625, and types of generators for producing swing current are described in my co-pending applications, Serial Nos. 199,625, 199,626 and 199,630.

For use in the specification and claims of this application, the term "swing current" refers to a current flow produced by a potential which varies in a definite manner over a fixed period of time, repetitively, with substantially constant and uniform speed and with a frequency between 1 and 1.5 cycles per second. The wave form of the potential need not conform to any precise pattern. A "swing current generator" is to be understood to be a device for producing current either directly by generation or indirectly by modification of an existing potential.

In the specification and claims, the term "swing current meter" refers to a meter which has a unidirectional field (usually, but not necessarily, of the permanent magnet type) and a movable coil suspended in the field and arranged to deflect a needle over a center zero scale, the direction of deflection reversing with each change of direction of the current in the coil, the coil construction being such as to avoid all damping effects leaving the moving element free to swing as a substantially true pendulum when the coil circuit is open.

Referring to the drawings, Fig. 1. A, B, C, and D are stakes or rods driven into the ground or any suitable earth electrodes. 150 represents a swing current generator having two terminals 8 and 9. 1, 2, 3, and 4 are fixed resistances and 5 a variable resistance provided with a sliding contact 6 and with a scale 7 which may be conveniently calibrated from zero to 1,000 over the range of the variable resistance. 8, 9, 10, 11, and 12 are conventional metal blocks arranged to be connected together by plugs, as 13, the metal blocks being connected to the fixed resistances so that each plug, when inserted, short-circuits one section of resistance. The equipment as a whole, within the dotted enclosure 60 and terminating at terminals 46 and 47, is hereinafter referred to as a "Reading resistance." 16 is an adjustable resistance. 80 is a swing current meter having differential elements, each element having a choke coil, as 20, and a condenser, as 21, connected in series with a movable coil 22. A sensitivity control 19 is connected across each element. The meter is provided with a zero-center scale, as 23, and with four binding posts 24, 25, 26, and 27. The elements connected to terminals 24—25 and to 26—27 are hereinafter referred to as the "first"

and "second" elements respectively. The two sensitivity controls 19—19 may be mounted on a common shaft and operated by a single knob. 90 is a three-pole double throw switch having a protective resistance 17 connected between two of its terminals, and 33 is a single-pole three-way switch. 18 is a protective fuse, usually about 1 ampere. The equipment as a whole, within the dotted enclosure 70, and terminating at terminals 48, 49, and 50, is hereinafter referred to as a "Calibrating resistance."

When 90 is thrown to the "calibrate" position, the resulting connections are as shown in Fig. 2; and when switch 90 is thrown to the "test" position, the resulting connections are as shown in Fig. 3.

The circuit from C into the earth, through the earth and out of the earth through electrode D is hereinafter referred to as "Electrode circuit C—D." The resistance of this circuit may be anything from a few ohms to several thousand ohms and, of course, must not be confused with the resistance of the earth path across which the drop in potential is being picked up by electrodes C and D and which resistance is more often less than more than one ohm.

Referring to Fig. 2, it will be seen that the connections result in connecting the second element of the meter 80 across the calibrating resistance with the earth electrode circuit C—D in series, while the first element is connected across the reading resistance with the resistance 16 in series and the reading and calibrating resistances and the protective resistance 17 are connected in series with the generator. In Fig. 3 the connections are so altered that the current now flows through the ground, via electrodes A and B, instead of through the protective resistance and the second meter element is connected directly to electrodes C and D.

All of the equipment shown within the dotted enclosure 100 may be assembled in a single portable housing provided with binding posts 40 and 41 for connection to the swing current generator, and with binding posts 42 and 43 for connection to the current electrodes A and B, and binding posts 44 and 45 for connection to electrodes C and D, as shown in Fig. 4. Hereinafter 100 is referred to as "Potential comparator".

In conducting a test by the Wenner method and using the apparatus shown in Fig. 1, binding posts 40 and 41 are connected to terminals 8 and 9 of the swing current generator 150. Terminal 42 is connected to a current electrode, as A, terminal 43 to a return current electrode, as B, and 44 is connected to a potential probe, as C, and 45 to a potential probe, as D; A, B, C and D being positioned in the earth in the conventional manner for tests of this character. With switch 90 in the test position, the reading resistance is adjusted until meter 80 shows no deflection. This may be termed the "preliminary balance."

Since the resistance values to be determined may vary over a considerable range as, for instance, from .001 ohm to 15 ohms and since the resistance of the electrode circuit C—D may vary greatly for different positions in the field, the variations extending from a value of only a few ohms to several thousand ohms, it is desirable that instrument 80 be calibrated under approximately the field conditions which exist for each particular test and this is accomplished in the following manner. After the preliminary balance has been obtained, as outlined above, switch 90 is thrown to the "calibrate" position and the calibrating resistance is adjusted, by means of switch 33, to correspond, as nearly as possible, to the value of the reading resistance previously found necessary to balance the meter, and the reading resistance is now readjusted to correspond exactly with the calibrating resistance. Resistance 16 is now adjusted until a perfect balance is obtained, which will be possible only when resistance 16 has been adjusted to exactly compensate for the resistance of electrode circuit C—D. Having completed the calibration, switch 90 is again returned to the test position and the reading resistance adjusted until the final balance is obtained when the value of the reading resistance will indicate the resistance of the earth path which is producing the potential between electrodes C—D.

While I have shown, in device 70, only three calibrating units having values of .1, 1, and 10 ohms, it is of course understood that the calibrating resistance unit may have as great a range and as many subdivisions as desired. With respect to the reading resistance 60, I prefer, for the variable resistance unit 5, a slide wire preferably mounted with a scale having 1,000 equal divisions. The fixed unit 4 is made exactly equal to the resistance of the slide wire 5, unit 3 is exactly twice 5, unit 2 four times 5, and unit 1 eight times 5. With this combination of resistances and a scale of 1,000 divisions on slide wire 5, the reading resistance 60, as a whole, may be adjusted and read for any value of the earth resistance from zero to 16 ohms in steps of .001 ohm. The resistance of the slide wire need not be exactly one ohm, and, in fact, it may be made about 5 ohms to advantage, the value of resistance 16 being made correspondingly large. The swing frequency of the meter 80 is coordinated with the frequency of the swing current generator 150.

It will be apparent that the windings of the two elements of the null indicator need not have the same number of turns but that the total number of turns in the two units may be divided between the two units in almost any proportion desired. For instance, it is feasible to put 90% of the turns on the second element and 10% on the first element and in some respects and for some classes of testing this arrangement has a distinct advantage, but on the other hand it is also feasible to put an equal number of turns on each element and otherwise so adjust the elements that when the same potential is applied to the two elements the resulting torques will be equal and opposite. Now, if the meter have the latter construction it will be quite evident that there will be no necessity for a separate calibrating resistance and that the meter can be calibrated by connecting both the elements in multiple to the reading resistance or to any other suitable source of calibrating current.

While I have described one type of reading resistance, as 60, it is understood that there are numerous conventional resistance boxes and slide wire combinations which may be used for this purpose. All the resistance elements should be designed to carry one ampere without overheating and without temperature errors.

In place of the differential swing meter 80, there may be employed a differential swing meter having a single moving coil, as 80A of Fig. 5. The meter includes a permanent magnet field 71 and movable coil 22 and choke coil 20 all in series with a winding 52 of a transformer 53 which transformer has two additional coils 54 and 55, the terminals of these coils being connected to binding posts 24, 25, 26, and 27 which correspond to like binding posts on meter 80 of Fig. 1, and the test procedure is in nowise altered by the use of this optional type of meter. If it is desired, the meter may have incorporated in its conventional circuit a conventional thermionic amplifier indicated by 56 in Fig. 6.

The equipment within the dotted enclosure 80 (or 80A or 80B) is herein referred to as a "differential swing current galvanometer".

I prefer to use swing current for making tests of the character described because with swing current equipment all possibility of interference from foreign direct or alternating earth currents is eliminated but these disturbing factors are not always present or, if present, are not of sufficient magnitude to prevent approximate data being obtained by the use of either plain direct current equipment, alternating current equipment, or current which is changed from direct to alternating current and then back to direct current by means of synchronous commutators mounted on a common shaft as is frequently employed for this class of work, and my potential comparator is equally suitable for use with either direct current, alternating current, swing current or other types of test currents, it being only necessary that indicating devices 80 be suitable for operation on the particular type of current employed.

The differential swing current galvanometer 80 includes condensers 21 but if these be omitted the meter is suitable for operation on plain direct current. A conventional differential alternating current galvanometer or a differential telephone receiver would be substituted for meter 80 if alternating current were used. In Fig. 5, coil 52 might be connected to a simple telephone receiver for use with alternating or pulsating current of audible frequency.

There is usually a direct current potential between the potential probes C and D due to other causes than the drop produced by the flow of test current but when the potential comparator is in the calibrating position and the meter is balanced, then if meter 80 be a conventional direct current instrument, it is compensated not only for the resistance of the electrode circuit CD but also for such direct current potential between electrodes C and D as exists at the time of balance.

While I have described certain features more or less in detail, it will be understood that the invention will employ various devices of differing forms and construction and it is to be understood that the invention is not to be limited except by the scope of the appended claims taken in conjunction with the state of the prior art.

What I claim is:

1. Equipment for comparing the potential difference existing between two earth potential electrodes with the potential drop across a reading resistance; which includes a differential swing current galvanometer having a first element connected to the reading resistance and responsive to the drop in potential across said resistance, and a second element; an adjustable resistance connected in series with the moving coil of the first meter element; a source of current; two energizing current electrodes; and switching mechanism having an operative position as "Test" and an operating position as "Calibrate" and interconnecting leads so interconnecting the equipment that when the switch is in the calibrate position the reading resistance and the calibrating resistance are connected in series and to the source of current and the second element of the meter is connected to the calibrating resistance via the potential electrodes and responsive to the drop in potential across the calibrating resistance and when the switch is in the test position the reading resistance, the calibrating resistance, and the energizing electrodes are connected in series and the second element of the meter is connected directly to the potential electrodes.

2. Equipment for measuring the specific resistance of a body of earth through which an electric current is flowing which includes a swing current generator for supplying current, two energizing electrodes and a reading resistance all connected in series; two potential electrodes for making connections to the portion of the earth whose specific resistance is to be measured, and a differential swing current galvanometer one element of which is connected across the reading resistance and the other element of which is connected to the potential electrodes.

3. Equipment for making geophysical surveys which includes a swing current generator, two energizing earth electrodes, two potential electrodes, and a potential comparator having six fixed terminal posts, two for connection to the generator, two for connection to the energizing electrodes and two for connection to the potential electrodes together with interconnecting leads for connecting the comparator binding posts to the generator and to the electrodes.

4. Equipment of the character described comprising a source of swing current connected in series with an adjustable calibrated resistance and a first pair of ground electrodes adapted to be inserted at spaced points in a geological formation, a second pair of electrodes for connection to the ground across a portion of the formation between the points at which said first named electrodes are connected to the formation, a differential swing current galvanometer having a first and second element, leads connecting the calibrated adjustable resistance to one of said meter elements and leads connecting the second pair of electrodes to the second meter element; and a zero-center scale and a pointer associated with the elements of the meter for indicating when the elements are producing equal and opposite torques.

5. A potential comparator for comparing the potential difference existing between two earth potential electrodes with the potential drop across a reading resistance; which includes a reading resistance, a 1st and 2nd binding post for connection to the potential electrodes, a null detector having a first element connected to the reading resistance via an adjustable resistance and responsive to the drop in potential across the reading resistance, and a second element; a calibrating resistance; a 3rd and 4th binding post for connection to a source of current; a 5th and 6th binding post for connection to two energizing current electrodes; and switching mechanism having an operating position as "Test" and an operating position as "Calibrate" and interconnecting leads so interconnecting the equipment that when the switch is in the calibrate position the reading resistance and the calibrating resistance are connected in series and to the 3rd and 4th binding posts, the 5th and 6th binding posts are disconnected, and the second element of the meter is connected to the calibrating resistance via the 1st and 2nd binding posts and responsive to the drop in potential across the calibrating resistance; and when the switch is in the test position the reading resistance, the 3rd and 4th binding posts and the 5th and 6th binding posts are connected in series and the second element of the meter is connected directly to the 1st and 2nd binding posts; the first element of the null indicator being connected as above described regardless of the position of the switch.

6. Equipment for measuring the resistance of a portion of a circuit through which an electric power current is flowing and where the conditions are such that a connection to the points of the circuit between which the resistance is to be measured is possible only through a connection circuit having appreciable resistance of unknown value, which includes; a reading resistance connected in the power circuit; a differential null detector having one element connected, via an adjustable resistance, across the reading resistance and responsive to the drop in potential across said resistance and the other element connected, via the connection circuit, to the points of the power circuit between which the resistance is to be measured; and switch mechanism having an operating position as "test" and an operating position as "calibrate" and interconnecting leads so interconnecting the equipment that when the switch is in the "test" position the equipment is connected in the foregoing manner and when the switch is in the "calibrate" position the portion of the circuit whose resistance is to be measured is disconnected from the source of power current, the first element is connected via its adjustable resistance to receive the potential drop across a resistance through which a test current is flowing and the second element is connected, via the connecting circuit and that portion of the power circuit whose resistance is to be measured, to receive the potential drop across a resistance through which the same test current is flowing.

7. Equipment according to claim 6 characterized by the fact that in the "calibrate" position the two elements are connected to receive the potential drop across the reading resistance.

STEPHEN W. BORDEN.